(12) United States Patent
Verdoes

(10) Patent No.: US 6,495,044 B1
(45) Date of Patent: Dec. 17, 2002

(54) METHOD AND DEVICE FOR REMOVING A COMPONENT FROM SOLID PARTICLE MATERIAL BY EXTRACTION

(75) Inventor: Dirk Verdoes, Apeldoorn (NL)

(73) Assignee: Nederlandse Organisatie voor Toegepast-Natuurwetenschappelijk Onderzoek TNO, Delft (NL)

(*) Notice: Subject to any disclaimer, the term of this patent is extended or adjusted under 35 U.S.C. 154(b) by 0 days.

(21) Appl. No.: 09/830,216

(22) PCT Filed: Oct. 20, 1999

(86) PCT No.: PCT/NL99/00651
§ 371 (c)(1),
(2), (4) Date: Apr. 24, 2001

(87) PCT Pub. No.: WO00/24491
PCT Pub. Date: May 4, 2000

(30) Foreign Application Priority Data

Oct. 26, 1998 (NL) .............................. 1010393

(51) Int. Cl.$^7$ .............................. B01D 11/02
(52) U.S. Cl. .................. 210/634; 210/511; 426/417; 426/489; 422/269; 422/281; 436/178
(58) Field of Search .................. 210/634, 511; 436/178; 422/261, 269, 281, 283; 426/417, 489; 554/9

(56) References Cited

U.S. PATENT DOCUMENTS

| | | | | |
|---|---|---|---|---|
| 2,967,763 A | * | 1/1961 | Doman ........................ 422/283 |
| 4,675,133 A | * | 6/1987 | Eggers ........................... 554/9 |
| 4,859,371 A | * | 8/1989 | Diosady ....................... 554/12 |
| 5,976,595 A | * | 11/1999 | Ganguli ...................... 426/417 |
| 6,248,910 B1 | * | 6/2001 | Franke ........................... 554/9 |
| 6,270,736 B1 | * | 8/2001 | Barnes ........................ 422/269 |

FOREIGN PATENT DOCUMENTS

| | | | |
|---|---|---|---|
| DE | 837 978 | 8/1951 | ................. 422/269 |
| EP | 0 290 156 | 11/1988 | ................. 422/269 |
| FR | 50 315 | 3/1940 | ................. 422/269 |
| FR | 920 672 | 4/1947 | ................. 422/269 |
| FR | 2 213 080 | 8/1974 | ................. 422/269 |
| GB | 821 048 | 9/1959 | ................. 422/269 |

* cited by examiner

Primary Examiner—Ernest G. Therkorn
(74) Attorney, Agent, or Firm—Young & Thompson

(57) ABSTRACT

In order to remove a component from solid particle material by extraction, use is made of a column with one or more tubes which extend between the ends of the column, at least one filter being fitted in the wall of each tube. The particle material is fed in at a first end of the column and, forced by hydraulic pressure, moves along the abovementioned tubes to scraping means fitted at the second end of the column. Extraction liquid is fed into the column at the abovementioned second end and flows in countercurrent to the particle material in the direction of the abovementioned first end of the column. Extraction liquid with component from the particle material dissolved in said extraction liquid passes by way of the above mentioned filters into the abovementioned tubes and flows in countercurrent to the particle material to an outlet at the abovementioned first end. The particle material is scraped off at the abovementioned second end by the scraping means.

8 Claims, 2 Drawing Sheets

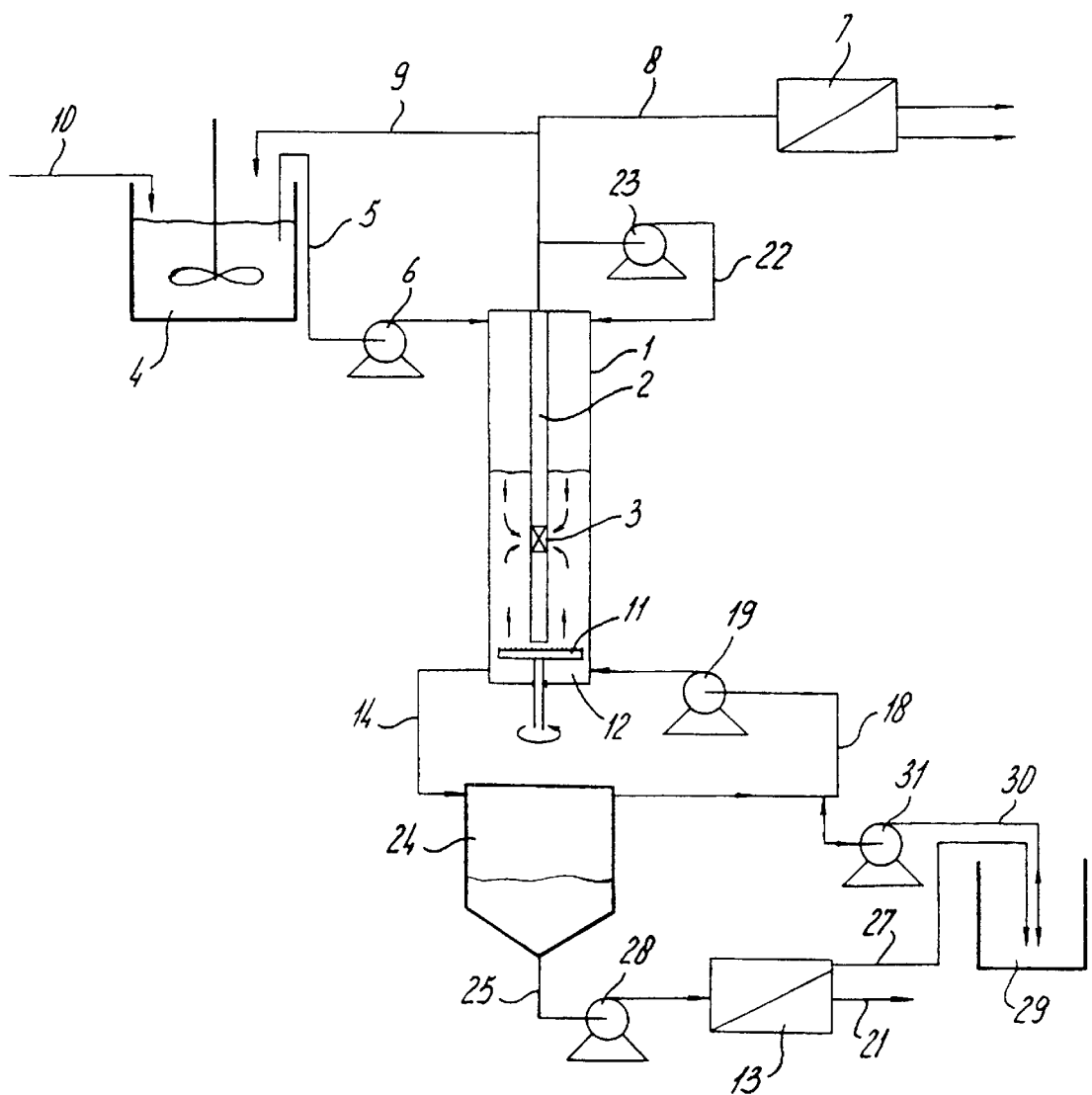

METHOD AND DEVICE FOR REMOVING A COMPONENT FROM SOLID PARTICLE MATERIAL BY EXTRACTION

REFERENCE TO RELATED APPLICATIONS

This application is a 371 of PCT/NL99/00651 filed Oct. 20, 1999.

The invention relates in the first instance to a method for removing a component from a solid particle material by extraction, in which an extraction liquid is brought in flowing contact with the particle material inside a column in which at least one tube extends, and the particle material is fed in at the first end of the column and—forced by hydraulic pressure—moves as a packed porous bed to scraping means fitted at the second end of the column, and the extraction liquid is fed into the column at the above-mentioned second end and flows in countercurrent to the particle material in the direction of the above-mentioned first end of the column, and the particle material is scraped off at the above-mentioned second end by the above-mentioned scraping means.

Such a method is disclosed in FR-A-2.213.080.

In the case of a known method the particle material for extraction and the extraction agent are in a number of successive vessels, the vessels with particle material being conveyed batchwise in a certain direction and the extraction agent being pumped in the opposite direction from one vessel to the next. The particle material gradually loses the above-mentioned component, and the extraction agent takes up said component. The bed of particle material stops in each vessel and the liquid extraction agent flows through it. Although on a macro scale this can be described as a countercurrent process, on a micro scale there is no question of countercurrent here. The process is relatively slow, and the extraction yield leaves something to be desired.

Another known process is described by George C. Blytas in "Chemical Engineering Communication", 1990, Vol. 88, pp. 127–151, under the title "Continuous countercurrent solid-liquid contacting in rotary disc contactors". A column with discs placed above one another is described in this article. The force of gravity causes solid particles of resin to fall from the top to the bottom of the column and to absorb benzene from an upward-flowing supply stream. Situated between the perforated plates are siring elements which rotate at high speed in order to suspend the particle material. The particle material consists of, for example, resin. This process is also slow and can be carried out only when the particle material settles sufficiently in the extraction agent.

The object of the invention is to provide a method of the type described in the preamble which leads to a relative high speed and a relative high yield and which does not have the disadvantages of the known methods.

According to the invention, the method is characterized in that at least one filter is fitted in the wall of each tube and that extraction liquid with component from the particle material dissolved in said extraction liquid passes by way of the above-mentioned filter or filters into the above-mentioned tube and flows in countercurrent to the particle material to an outlet at the above-mentioned first end, said outlet being connected to the tube, and that the scraped particles are discharged via a washing chamber.

It is important that the solid bed of particle material is moved, forced by hydraulic pressure, in the column, which hydraulic pressure is produced as a result of the filtration resistance of the porous bed of particle material present in the column. The process is preferably a continuous countercurrent process. The main advantage is that a relatively high speed and a high yield are achieved. The material to be extracted is, for example, crushed rapeseed, and the extraction agent hexane. The hexane extracts the oil from the rapeseed.

In order to ensure that a certain extraction by immersion is achieved before the particle material is conveyed into the column, the particle material is mixed beforehand in a tank with extraction agent or a mixture of extraction agent and the above-mentioned component.

The particles which are scraped off at the above-mentioned second end of the column and pass into a washing chamber situated below the scraping means are taken up in a circulating stream of clean extraction agent.

Part of the extraction agent, and a component dissolved therein leaving the tubes at the above-mentioned first end of the column, can be conveyed to the particle material to be fed into the column, while most of said extraction agent is conveyed to a separator for separating extraction agent and component from each other.

In order to limit the consumption of extraction agent, the mixture of extraction liquid and extracted particle material (extracted meal) leaving the column at the above-mentioned second end is separated, and the extraction agent resulting therefrom is pumped back to the above-mentioned second end.

A better yield is generally achieved when the extraction agent is at a raised temperature.

The invention also relates to a device for removing a component from solid particle material by extraction according to claim 1, comprising a column in which at least one tube extends, said column having a first and second end, means for feeding extraction liquid into the column at the second end thereof, and scraping means at the first end of the column for scraping off particle material from a packed porous bed.

Such a device is also disclosed in FR-A-2.213.080.

According to the invention the device is characterized in that in the wall of each tube at least one filter is fitted, that at the first end the outlet is connected to the tube or tubes, and a washing chamber is situated near the scraping means so that scraped off particles are discharged via said washing chamber.

BRIEF DESCRIPTION OF THE DRAWINGS

FIGS. 1 and 2 show two embodiments for removing a component from a solid particle material by extraction.

DESCRIPTION OF THE PREFERRED EMBODIMENTS

Figure 1:
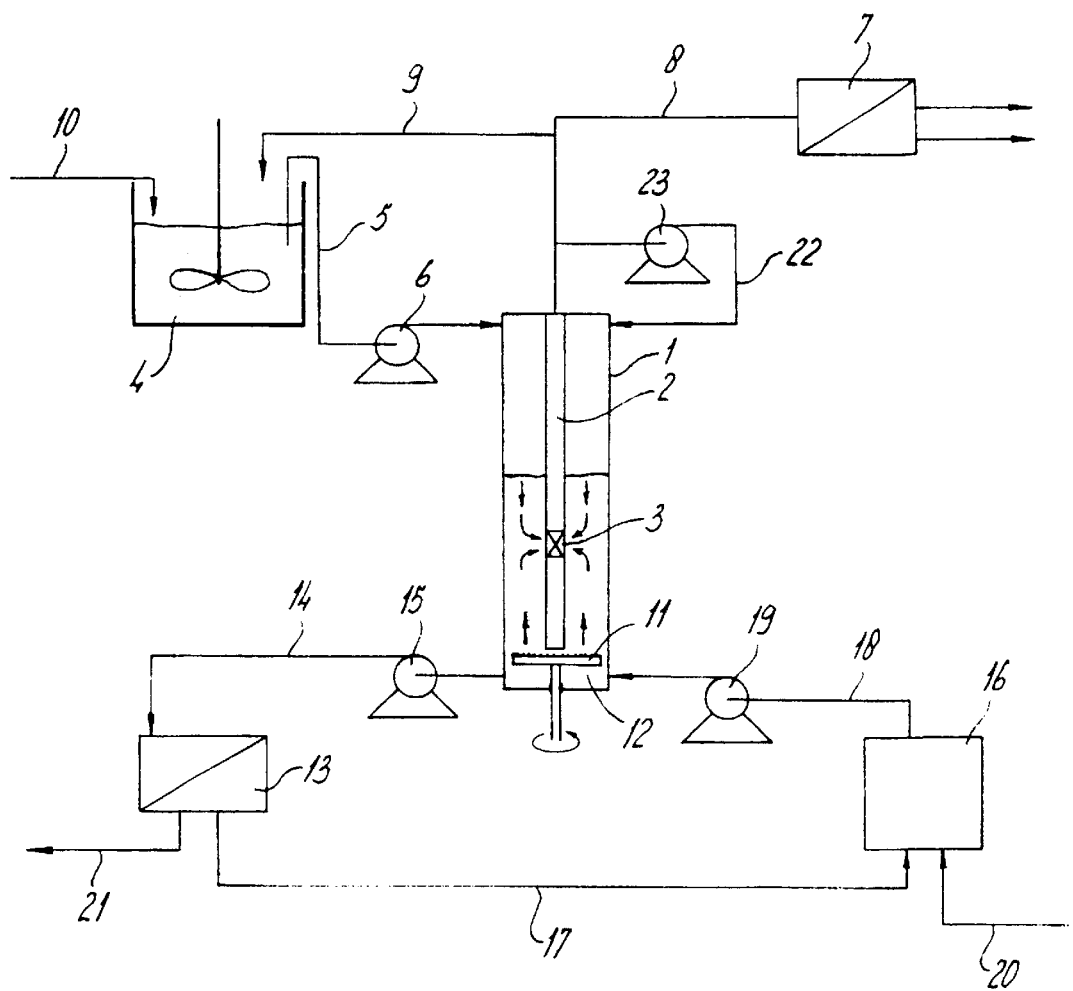

The invention will now be explained in greater detail with reference to two figures, in which diagrammatic embodiments of the device are shown.

In the figures the reference numerals denote the following:

FIG. 1
1=column
2=tube fitted in the column 1
3=filter fitted in the wall of the tube 2
4=mixing tank
5=line between mixing tank 4 and column 1
6=pump fitted in the line 5
7=separator for separating extraction agent and component (product)

8=line between the tube 2 and the separator 7
9=line branched off from the line 8 and running to the mixing tank 4
10=supply line to the mixing tank 4
11=rotary scraping knife
12=washing chamber
13=separator for separating particle material and extraction liquid
14=line going out from washing zone
15=pump in line 14
16=stock tank for ordinary extraction agent
17=hexane line from the separator 13
18=line for supplying hexane to washing zone 12
19=pump in line 18
20=supply line for extraction liquid to tank
21=outlet for extracted particle material coming from the separator 13
22=recirculation line
23=pump in line 22
FIG. 2
24=closed settler
25=discharge line of settler 24
27=hexane line from separator 13
28=pump in line 25
29=open hexane tank
30=hexane supply and discharge line between open hexane tank 29 and circuit line 18
31=pump in line 30

The solid-liquid extraction process according to the invention will be explained in greater detail with reference to the extraction of oil from rapeseed by means of the extraction liquid n-hexane, although the principle of the invention offers many kinds of potential applications, such as the extraction by acid of metals from ore, the extraction of impurities from solids, and the extraction of pharmaceutically or chemically valuable constituents from solids.

In the case of the embodiment according to FIG. 1 crushed rapeseed is fed into the mixing tank 4 by way of the line 10, and hexane with oil dissolved therein is fed into the mixing tank 4 by way of the line 9. The pumpable mixture of these constituents is conveyed by means of pump 6 and the line 5 into the column 1, with the result that a packed porous bed is produced in the column. The pure solvent (extraction agent) hexane is fed into the bottom of the column by means of the pump 19 by way of the line 18. Part of this pure hexane runs upwards in the column. As a result of the liquid flow through the packed bed and the filtration resistance of the bed, a hydraulic pressure occurs above the bed, which hydraulic pressure supplies the conveyance force for moving the bed downwards in countercurrent and into contact with the upward-flowing hexane in the bottom zone of the column (between the scraping knife 11 and the filter 3).

The rotary scraping knife 11 scrapes off the seed bed layer by layer in the bottom of the column.

During the countercurrent between seed bed and hexane, oil from the seed dissolves in the hexane. This hexane oil solution is conveyed by way of the filter 3 into the tube 2 and from there by way of the line 8 to a separator 7, in which hexane and oil are separated from each other. The oil is discharged as a product, and the hexane—possibly after undergoing an after-purification—can be conveyed to the tank 16. Some of the hexane-oil mixture can be conveyed by way of the branch line 9 to the mixing tank 4. Some of the filtrate (hexane solution) can be recirculated, if desired, by means of pump 23 and line 22.

The particles scraped off by the scraping knife 11 pass into the clean hexane liquid in the washing chamber 12 below the knife.

The delivery of clean hexane flowing in countercurrent to the bed can be set by means of pumps 19 and 15. This hexane delivery is called the extraction delivery. As an example, the volume proportions can be as follows: pump 15 discharges per unit time 5 litres of clean hexane and scraped-off seed—which through extraction has released a large part of the oil and is called extracted meal—from the washing chamber 12. These are separated in separator 13 into one litre of extracted meal to be discharged, said extracted meal being discharged by way of line 21, and 4 litres of clean hexane, which is conveyed to the tank 16. From said tank 16 five litres of clean hexane is conveyed by means of pump 19 and by way of line 18 to the washing chamber 12, of said five litres one litre of hexane being conveyed upwards in countercurrent to the bed. The process described is continuous. By pumping more or less clean hexane into the washing chamber by means of pump 19, the extraction delivery can be increased and reduced respectively, the minimum quantity being slightly higher than the quantity of hexane required for the discharge of the extracted meal (in this example four litres). This makes the extraction of oil from the seeds quicker and cheaper than is the case in known processes. For the invention it is important that a component is removed by a liquid from solids by extraction in countercurrent on a micro scale and that the liquid with the component dissolved therein is discharged by way of a filter and a tube. Instead of one tube 2, several tubes 2, preferably uniformly distributed over the cross section of the column 1, can also be used. Increasing the diameter of the column at the same time will increase the capacity for the processed particle material (capacity is directly proportional to the diameter squared). It will be clear that a certain extraction occurs beforehand by immersion during the mixing of the particle material and the extraction agent in the mixing tank 4.

The miscella conveyed to the separator 7 by way of the tube 2 and the line 8 comprises, for example, 70% hexane and 30% oil.

The results of the process are dependent, inter alia, upon the temperature of the hexane and the residence time in the column, the particle size of the crushed seed, the level of the extraction delivery and the vertical distance between scraping knife and filter. Increasing the temperature of the hexane (for example, to 50° C.) leads to a significant reduction of the residual oil content in the seed, for example from 6.1 to 3.8%, assuming an oil content of 47.2% in the crushed seed which through the immersion extraction in mixing tank 4 has decreased to a value between 29.6 and 32.8% at the time of infeed at the top of column 1.

The circuit 12, 14, 24, 18, 19 below column 1 is filled completely with clean hexane at the time of start-up. As a result of the bed being scraped off in the column, the scraped-off seed (extracted meal) goes into this circuit, with the result that the extracted meal pushes an equal volume of clean hexane out of the circuit. This clean hexane is forced to flow upwards in the column in countercurrent to the bed. The closed settler in the embodiment according to FIG. 2 is operated in such a way that the discharge of the settled extracted meal by way of line 25 and pump 28 ensures that the settled extracted meal remains at a constant height in the settler 24. Moreover, the settler 24 is operated in such a way that completely or almost completely particle-free extraction agent is extracted at the top by way of line 18. The extracted meal discharged from the settler is separated from the hexane in separator 13. After the separation, the hexane is recirculated to the circuit by way of the line 27, tank 29, line 30 and pump 31. The suppletion of hexane to the circuit is at least equal to the discharge of extracted meal plus hexane from the bottom of settler 24, so that the circuit always remains filled. For the rest, the suppletion delivery of clean hexane by way of line 30 and pump 31 is freely adjustable. As a result, the extraction delivery, i.e. the flow of clean hexane leaving the circuit by way of the column in countercurrent to the downwards moving bed, is also freely adjustable. It is therefore not necessarily the case that the extraction delivery of clean hexane is equal in volume flow to the volume flow of scraped-off seed. The complete arrangement according to the embodiment in FIG. 2 is operated continuously.

What is claimed is:

1. Method for removing a component from a solid particle material by extraction, in which an extraction liquid is brought in flowing contact with the particle material inside a column in which at least one tube extends, and the particle material is fed in at the first end of the column and—forced by hydraulic pressure—moves as a packed porous bed to scraping means fitted at the second end of the column, and the extraction liquid is fed into the column at the above-mentioned second end and flows in countercurrent to the particle material in the direction of the above-mentioned first end of the column, and the particle material is scraped off at the above-mentioned second end by the above-mentioned scraping means, characterized in that at least one filter is fitted in the wall of each tube and that extraction liquid with component from the particle material dissolved in said extraction liquid passes by way of the above-mentioned filter or filters into the above-mentioned tube and flows in countercurrent to the particle material to an outlet at the above-mentioned first end, said outlet being connected to the tube, and that the scraped particles are discharged via a washing chamber.

2. Method according to claim 1, characterized in that the particle material fed in at the above-mentioned first end of the column is mixed beforehand in a tank with extraction liquid or a mixture of extraction liquid and the above-mentioned component, with the result that immersion extraction occurs.

3. Method according to claim 1, characterized in that a stream of clean extraction liquid is circulating inside said washing chamber situated below the scraping means.

4. Method according to claim 1, characterized in that the extraction liquid, and the component dissolved therein leaving the tubes at the above-mentioned first end of the column, are conveyed to a separator in order to separate extraction liquid and component from each other.

5. Method according to claim 4, characterized in that part of the extraction liquid, and the component dissolved therein leaving the tubes at the above-mentioned first end of the column, is mixed into the particle material to be supplied to the column.

6. Method according to claim 1, characterized in that the mixture of extraction liquid and extracted particle material leaving the column at the above-mentioned second end is separated and the additional extraction liquid resulting therefrom pumped back to the above-mentioned second end.

7. Method according to claim 1, characterized in that the method is carried out continuously.

8. Device for removing a component from solid particle material by extraction according to claim 1, comprising a column (1) in which at least one tube (2) extends, said column having a first and second end, means (18) for feeding extraction liquid into the column at the second end thereof, and scraping means at the first end of the column for scraping off particle material from a packed porous bed, characterized in that in the wall of each tube (2) at least one filter (3) is fitted, that at the first end the outlet (8) is connected to the tube (2) or tubes, and a washing chamber (12) is situated near the scraping means (11) so that scraped off particles are discharged via said washing chamber (12).

\* \* \* \* \*